United States Patent
Schuhn (10) Patent No.: US 9,327,463 B2
(45) Date of Patent: May 3, 2016

(54) DEVICE AND METHOD FOR PRODUCING TUBES FOR PACKAGING TUBES

(75) Inventor: Daniel Schuhn, Zurich (CH)

(73) Assignee: Packsys Global (Switzerland) Ltd., Ruti (CH)

( * ) Notice: Subject to any disclaimer, the term of this patent is extended or adjusted under 35 U.S.C. 154(b) by 210 days.

(21) Appl. No.: 13/978,554

(22) PCT Filed: Jan. 3, 2012

(86) PCT No.: PCT/EP2012/050042
§ 371 (c)(1),
(2), (4) Date: Sep. 18, 2013

(87) PCT Pub. No.: WO2012/093112
PCT Pub. Date: Jul. 12, 2012

(65) Prior Publication Data
US 2014/0000812 A1 Jan. 2, 2014

(30) Foreign Application Priority Data
Jan. 7, 2011 (DE) .......................... 10 2011 008 068

(51) Int. Cl.
*B29C 53/42* (2006.01)
*B29C 53/82* (2006.01)
(Continued)

(52) U.S. Cl.
CPC ................ *B29D 23/00* (2013.01); *B29C 53/50* (2013.01); *B29C 53/82* (2013.01); *B29C 53/84* (2013.01);
(Continued)

(58) Field of Classification Search
CPC ......... B29C 53/50; B29C 53/54; B29D 23/00
See application file for complete search history.

(56) References Cited

U.S. PATENT DOCUMENTS

| 3,388,017 A | 6/1968 | Grimsley et al. |
| 3,575,769 A | 4/1971 | Radzio |

(Continued)

FOREIGN PATENT DOCUMENTS

| CH | 679 758 | 4/1992 |
| CH | 680 350 | 8/1992 |

(Continued)

OTHER PUBLICATIONS

International Search Report dated Apr. 17, 2012.
(Continued)

*Primary Examiner* — William Bell
(74) *Attorney, Agent, or Firm* — Bachman & LaPointe, PC (57) ABSTRACT

A device for producing tubes for packaging tubes, comprising an elongated mandrel (3), around which a substrate web can be formed in order to produce a tubular form (4) that surrounds the mandrel (3) and can be conveyed along the mandrel (3) in a conveying direction (R), as well as welding means (9) for welding the substrate web along a welding region in order to produce a welding seam (11) and at least one first welding belt (34) that can be conveyed together with the tubular form (4) and fixes the tubular form in a contact region of the substrate web with itself by clamping the substrate web between the first welding belt (34) and a clamping partner, wherein means (13) are provided for expanding the tubular form (4) fixed by the first welding belt (34) and the clamping partner by plastically elongating the substrate web in the circumferential direction, wherein said means can be adjusted into a position, in which they radially protrude over the outer surface (14) of the mandrel section (31) of the mandrel (3) that is arranged upstream of the means (13) referred to the conveying direction (R).

15 Claims, 6 Drawing Sheets

(51) Int. Cl.
*B29D 23/00* (2006.01)
*B29C 53/50* (2006.01)
*B29C 53/84* (2006.01)
*B29C 65/00* (2006.01)
*B29C 65/02* (2006.01)
*B29C 65/04* (2006.01)

(52) U.S. Cl.
CPC ............ *B29C 65/02* (2013.01); *B29C 66/0342* (2013.01); *B29C 66/1122* (2013.01); *B29C 66/343* (2013.01); *B29C 66/344* (2013.01); *B29C 66/4322* (2013.01); *B29C 66/49* (2013.01); *B29C 66/81419* (2013.01); *B29C 66/82421* (2013.01); *B29C 66/83423* (2013.01); *B29C 65/04* (2013.01); *B29C 66/72321* (2013.01); *B29C 66/83421* (2013.01)

(56) References Cited

U.S. PATENT DOCUMENTS

| | | | |
|---|---|---|---|
| 4,123,312 A * | 10/1978 | Schmid et al. | ................ 156/466 |
| 4,746,391 A | 5/1988 | Heyse et al. | |
| 5,310,443 A | 5/1994 | Burger | |
| 5,569,144 A | 10/1996 | Schwyn | |
| 2004/0040261 A1 * | 3/2004 | Troyer et al. | .................... 53/451 |
| 2010/0193125 A1 * | 8/2010 | Thomasset | .................... 156/296 |

FOREIGN PATENT DOCUMENTS

| | | |
|---|---|---|
| CH | 695 937 | 10/2006 |
| CN | 87106852 A | 5/1988 |
| CN | 1090526 A | 8/1994 |
| DE | 1 938 568 | 2/1971 |
| GB | 1161903 A | 8/1969 |
| JP | 53-119980 | 10/1978 |
| JP | 05-229099 | 9/1993 |
| JP | 07-125895 | 5/1995 |
| JP | 08324600 A | 10/1996 |
| JP | 09-001662 | 1/1997 |
| JP | 09-155967 | 6/1997 |
| JP | 2001-198981 | 7/2001 |
| WO | 94/04343 | 3/1994 |

OTHER PUBLICATIONS

Chinese Office action for Application No. 201280012037.5 dated Dec. 11, 2014.

Japanese Office action for Application No. 2013-547845 dated Jun. 8, 2015.

* cited by examiner

DEVICE AND METHOD FOR PRODUCING TUBES FOR PACKAGING TUBES

BACKGROUND OF THE INVENTION

The invention pertains to a device for producing tubes for packaging tubes, comprising an elongated mandrel, around which a substrate web that comprises, in particular, at least one plastic film and a metal foil and/or a metallization can be formed in order to produce a tubular form that surrounds the mandrel and can be conveyed along the mandrel in a conveying direction, as well as welding means for welding the substrate web along a welding region of the tubular form in order to produce a welding seam, wherein the welding region is formed, for example, by an overlapping region produced between two longitudinal edges of the substrate (by two parallel longitudinal edge regions) or alternatively, for example, by two abutting surfaces (contact surfaces) on the longitudinal edges of the substrate web. The invention furthermore pertains to a method for producing tubes for packaging tubes, preferably by means of an inventive device, wherein a substrate web is formed around an elongated mandrel in such a way that the substrate web surrounds the mandrel in order to produce a tubular form, and wherein the substrate web is welded along a welding region in order to produce a welding seam.

Crease formation occurs on the welding seam, in particular, of tubes that are produced of a substrate web that comprises a metal foil and/or a metallization layer in addition to at least one plastic film, wherein this crease formation is undesirable because it affects the optical or aesthetical appearance of the tube body and therefore of the finished tube. Creases or depressions that are spaced apart in the axial direction and extend transverse to the longitudinal direction of the tube, i.e. in the circumferential direction, are typically formed in the welding seam during the welding process.

Another problem in the conception and manufacture of devices for producing tubes can be seen in that the mandrel used, around which the substrate web is formed, for example, with the aid of concave rollers in order to produce the tubular form, needs to be exactly dimensioned with respect to its diameter because the mandrel diameter defines the inside diameter of the tube and therefore the filling volume. The manufacture of the mandrel is very costly because the mandrel needs to have an extremely high resistance due to the abrasive effect that occurs when the tubular form is conveyed along the mandrel in the conveying direction. Even the slightest deviations from the nominal geometry lead to the rejection of the mandrel. The aforementioned problem exists regardless of the substrate structure, i.e. it concerns substrate films with a metal layer or metallization, as well as substrates that consist entirely of plastic.

WO 2009/034485 A1 discloses a method for producing tubes with round cross section, wherein this method aims at elongating a welding seam in the conveying direction of the tubular form or perpendicular thereto, i.e. in the circumferential direction. In this case, it is necessary to arrange corresponding means for elongating the welding seam downstream of a welding device referred to the conveying direction of the substrate in order to ensure at least partial cooling of the substrate prior to the elongation as disclosed in the master claim of the application, wherein this at least partial cooling of the substrate is required for producing a welding seam that should then be longitudinally and/or laterally elongated. This publication addresses the optimization of the roundness of tubular bodies, but not blemishes of a welding seam to be produced.

US 2010/000674 A1 discloses a method and a device for producing tubular bodies, wherein the method and the device aim at respectively connecting the longitudinal sides of the substrate material indirectly or not only by fusing the substrate material.

In fact, a separate fused-on plastic strip is used for connecting the longitudinal edges of the substrate web to one another. In the known device, the tube diameter and its circumference are respectively defined by the width of the substrate web and the spacing of the longitudinal edges of the substrate web only. The known device features height-adjustable moulding means in order to respectively adjust the thickness of the welding seam or of the additionally fused-on plastic material after a definitive adjustment of the tube diameter. In this case, the moulding means operate in a stress-free fashion referred to the circumferential direction of the tubular form produced. The radial adjustability of the moulding means is limited by an outer ring and the plasticized mass accommodated between the ring and the moulding means such that the moulding means cannot be adjusted beyond the outer circumference of the mandrel.

SUMMARY OF THE INVENTION

Based on the aforementioned prior art, the invention aims to disclose a device and a method for producing tubular bodies, by means of which crease formation can be at least largely prevented on substrates that contain metal, preferably a laminated substrate that features at least one plastic film and a metal layer and/or a metallization.

With respect to the device, this objective is attained as disclosed herein, wherein said objective is also attained with respect to the method.

Advantageous enhancements of the invention are defined in the dependent claims. The scope of the invention includes all combinations of at least two characteristics disclosed in the description, the claims and/or the figures.

In order to avoid repetitions, characteristics disclosed with reference to the device should be considered as being disclosed with reference to the method and claimable. Characteristics disclosed with reference to the method should likewise be considered as being disclosed with reference to the device and claimable.

The invention is based on the notion of providing means, i.e. extension or expansion means, that radially protrude over the preferably cylindrical outer surface of an outer surface section of the mandrel that is arranged upstream of the means referred to the conveying direction of the substrate or can be adjusted into such a protruding position such that the tubular form transported by the means in the longitudinal direction of the mandrel is elongated, i.e. expanded or extended, and the crease formation tendency therefore is reduced. This means that the substrate web is elongated, i.e. plastically extended, in order to thusly achieve the desired permanent diametral or circumferential expansion and ensure that crease formation is prevented. In order to respectively generate the required tension in the substrate web material or in the tubular form in the circumferential direction, it is necessary to fix the tubular form while the means protrude in the radial direction in order to generate the corresponding expansive force in the tubular form in the circumferential direction, namely by clamping the tubular form in a contact region, in which the substrate web contacts itself due to a circumferential overlap of two longitudinal edge regions or due to the abutment of the longitudinal substrate edges, such that the diametral expansion is not or at least not exclusively based on an elongation-free displacement of the longitudinal substrate web edges relative to one another, but rather on an elongation of the substrate web, i.e. a plastic expansion in the circumferential direction. Only this plastic deformation in the circumferential direction in a region of the tubular form that is situated circumferentially adjacent to the contact region makes it possible to reliably prevent the undesirable crease formation on substrates that contain metal.

The degree of the expansion or the diameter enlargement can be adjusted by accordingly selecting the extent of the protrusion of the means over the outer surface of the outer surface section that is arranged upstream of the means referred to the conveying direction of the substrate. The effective diameter of the mandrel therefore is enlarged due to the means. The substrate or the tube being heated in its welding region respectively adjoins the means that protrude over the outer surface of the mandrel with its inner circumferential surface such that a force is exerted upon the tubular form radially outward from the inside and respectively acts upon or expands the tubular form in the circumferential direction. Two alternatives are available with respect to the configuration and the dimensions of the mandrel in a region arranged downstream of the means referred to the conveying direction of the substrate. According to a first alternative, the effective (enlarged) diameter defined by the means can be maintained or the effective diameter of the mandrel is once again reduced downstream of the means, preferably to the dimension of the mandrel section arranged upstream of the means referred to the conveying direction, according to a second alternative.

Different options are available with respect to the design of the clamping means. For example, the clamping means may comprise two welding belts that preferably are driven with at least approximately the conveying speed of the tubular form and respectively clamp the tubular form or the contact region between one another in order to thusly prevent an elongation-free displacement of the longitudinal edges of the substrate web relative to one another during the elongation process. It would alternatively also be conceivable to provide only one welding belt that cooperates with a stationary opposite surface on the side situated opposite of the contact region in order to generate the clamping force.

It is essential to arrange the means relative to the clamping means in such a way that the clamping means generate a force that circumferentially acts upon the substrate web and elongates, i.e. plastically extends, the substrate web in the circumferential direction.

In this respect, it is possible to already realize such a plastic elongation in a region prior to the production of the welding seam. An elongation may additionally or alternatively also be realized after the production of the welding seam, i.e. after the material has at least partially or completely hardened.

The contact region of the substrate web with itself comprises the welding region, as well as a section that lies upstream of the actual welding region referred to the conveying direction and in which the substrate web overlaps or the longitudinal edges of the substrate web alternatively abut without already being fused. It is essential to realize the clamping with the aid of the clamping means in such a way that a force can be introduced into the substrate web by the means in the circumferential direction and this force respectively elongates or extends the film material permanently.

In addition to the plastic deformation, an elastic deformation also results due to the effect of the expansion means in combination with the effect of the clamping means, but this elastic deformation is reversible—the plastic deformation, i.e. the irreversible deformation, is permanently effective for the respective diametral expansion or circumferential expansion.

The inventive extension or elongation of the tubular form in the circumferential direction would not even be possible with the device described in US 2010/000674 A1 if the corresponding means could be adjusted beyond the mandrel surface because the dimensioning of the respective diameter or circumference is realized with the width of the substrate web only and the height-adjustable moulding means proposed in this publication only define the thickness of the fluid plastic mass that is supplied in a connecting region in order to connect the longitudinal edge regions of the substrate web to one another.

The moulding means do not introduce an expansive force into the substrate web in the circumferential direction, particularly in a region situated adjacent to a connecting region.

The inventive method and the inventive device preferably do not require an additional liquid material portion, but rather produce the welding seam by solely fusing the substrate web adjacent to a welding belt, i.e. the resulting welding seam preferably contains no additional material other than the substrate web material.

It is particularly preferred that no rigid web moulding means that would impair an adjusting motion of the preferably radially adjustable expansion means are situated at the circumferential position of the expansion means in a region situated radially outside the substrate web. At least one moulding strap is preferably provided outside the substrate web.

The means preferably are arranged relative to the welding means in such a way that no welding seam is produced yet at the axial position (effective position or force application position) of the expansion means, i.e. that either the substrate has not yet reached its maximum temperature at the axial position of the expansion means or at least no cooling of the welding region has occurred yet such that the material is not yet rigidly connected by producing a welding seam. It is therefore particularly preferred to arrange the expansion means upstream of the axial end of the welding means (referred to the conveying direction), i.e. upstream of the axial end of the actual heat source for heating the substrate, such that the maximum temperature of the substrate is only reached downstream of the means referred to the conveying direction. In this case, it is particularly preferred that the welding means comprise at least one HF-source (high-frequency source) that extends as far as a region situated axially downstream of the means. It proved particularly advantageous if the means axially end in an axial region between $\frac{1}{3}$ and $\frac{2}{3}$ of the axial extent of the welding means.

However, it would also be conceivable to arrange the expansion means at an axial height adjacent to the welding means or downstream thereof referred to the conveying direction.

It is even possible to arrange the expansion means at an axial position, at which the welding seam is at least partially produced, i.e. the welding region has at least partially cooled.

The device and the method are particularly suitable for laminated substrates that comprise at least one plastic layer and at least one metal foil and/or one metallization because substrates of this type typically tend to the above-discussed crease formation. However, the invention is not limited to the utilization of such substrates; for example, the device and the method also make it possible to process substrates that consist exclusively of metal or exclusively of plastic, particularly of a plastic laminate, into tube bodies for packaging tubes, particularly for the cosmetic and food industries. An embodiment that is described in greater detail below and in which the effective diameter can be adjusted, preferably in a controlled fashion, is particularly interesting with respect to the lattermentioned substrates that, in particular, do not contain any metal and/or aluminium such as, e.g., PBL-films, NBL-films or CBL-films.

According to an embodiment that has a particularly simple construction, the means are formed by an axial section of the mandrel itself, wherein the diameter of the axial section that is preferably curved in the circumferential direction increases in the conveying direction of the substrate such that the tubular form is extended in the circumferential direction. According to a first preferred alternative, it is in other words possible that the means are formed by the mandrel itself or, in more precise terms, by an axial section of the mandrel that preferably has a continuously increasing diameter. For this purpose, the aforementioned axial section preferably has an at least approximately conical contour.

In an alternative embodiment, the widening axial section is realized in the form of an attachment that is attached to the actual mandrel.

According to an advantageous enhancement of the invention, it is proposed that the means feature at least one (expansion) element that is realized, in particular, in a plate-like fashion or formed by a circumferential section of the mandrel and serves for radially adjoining the inside of the tubular form. It is particularly preferred to provide two or more of these expansion elements that are or can be spaced apart from one another, in particular, in the circumferential direction in order to respectively pull on the welding region in two opposite circumferential directions or to respectively generate or cause an expansion force at two positions that are spaced apart from one another in the circumferential direction. It is particularly preferred to arrange the two expansion elements that are at least sectionally situated directly adjacent to the welding means or upstream of the welding means referred to the conveying direction such that they are circumferentially spaced apart from the welding means by at least approximately the same distance in order to homogenize the force effect.

It is particularly preferred if the at least one expansion element has a surface that is curved in the circumferential direction, wherein it is furthermore preferred if the curvature radius of the expansion element at least approximately corresponds to the curvature radius of the outer surface of the mandrel in order to obtain a largely cylindrical tube in this respect.

Alternatively to a plate-shaped design of the at least one expansion element, it is also possible that the at least one expansion element is formed by a circumferential section of the mandrel, wherein the circumferential section preferably has a curvature that corresponds to the remaining circumference. It is particularly advantageous if the thusly designed circumferential section can be adjusted in the radial direction manually or by means of an actuating drive.

It is particularly advantageous if the at least one expansion element is inclined in the longitudinal direction of the mandrel, i.e. in the direction of the front end of the mandrel or its end that is directed opposite to the conveying direction of the substrate web, in order to thusly form a run-up slope for the tubular form such that it can slide onto the means and bumping or tilting or jamming during the process is reliably prevented. In other words, the protrusion of the means over the outer surface of the mandrel preferably varies in the longitudinal direction of the means and increases in the conveying direction of the tubular form.

As initially mentioned, it is particularly preferred to arrange the means relative to the welding means in the longitudinal direction of the tube (i.e. in an axial direction) such that the welding means still heat the substrate at least partially after it passes the means, i.e. that the welding process is preferably not yet completed and a welding seam is not yet produced. The welding seam is not produced until the welding region has at least partially cooled. However, it would alternatively also be possible to arrange the expansion means relative to the welding means in such a way that a welding seam already is at least partially produced at the axial position (of the expansion means).

This may be realized, for example, by arranging the means at least sectionally upstream of the welding means referred to the conveying direction of the substrate, preferably at least upstream of the axial end of the welding means, i.e. the heat source for heating the substrate. In this case, the means preferably are arranged offset relative to the welding means in the circumferential direction, namely either circumferentially adjacent to the welding means or at least sectionally or entirely upstream thereof referred to the conveying direction. It is particularly advantageous if the means are, referred to the conveying direction, arranged upstream of the cooling means that serve for cooling the welding seam and consequently for solidifying (hardening) the welding seam and are arranged downstream of the welding means.

The means for plastically extending the tubular form in the circumferential direction are preferably arranged at at least one circumferential position that is circumferentially spaced apart from the welding region. The circumferential spacing from the welding region preferably amounts to at least 10°. All expansion means are preferably spaced apart from the welding region in the circumferential direction.

As initially mentioned, it is basically possible to arrange the means in a fixed, i.e. non-adjustable, protruding position relative to the outer surface of the mandrel, wherein it is advantageous if the means can be adjusted in the radial direction, for example, manually with the aid of at least one set screw such that the means can be adjusted in dependence on the tube diameter to be produced and/or in dependence on the consistency and/or the dimensions of the substrate, particularly with respect to an optimal smoothing effect and/or with respect to an adjustment of the desired diameter of the tube to be produced. Adjustable means for the first time make it possible to vary the tube diameter independently of the mandrel diameter within certain limits such that a completely exact mandrel geometry or mandrel diameter is no longer as important as before. Since adjustable means are provided, the mandrel may even be manufactured with a (slightly) smaller size than specified with respect to the desired tube volume or the desired tube diameter and the diameter can be adjusted by positioning the means accordingly. The means preferably can be adjusted in the radial direction by a distance in the range between 0.1 mm and 2.0 mm, preferably between 0.2 mm and 1.2 mm.

It is furthermore preferred that the means can not or not only be manually adjusted in the radial direction, but that an actuating drive, for example an electromotive, hydraulic or pneumatic actuating drive such as, for example, a rotary drive or a linear drive (e.g. piston/cylinder unit), is assigned to the means in order to automatically adjust the means in the radial direction and to therefore adjust the protrusion over the outer surface of the mandrel, wherein the means naturally form part of the actuating drive, particularly if it is realized in the form of a piston/cylinder solution.

Such an embodiment makes it possible to realize a control of the tube diameter if at least one sensor such as, for example, an optical sensor and/or a mechanical sensor, for example a tactile sensor or an ultrasonic sensor, etc., is provided for determining an actual dimension of the tubular form, particularly the diameter of the tubular form or the circumference of the tubular form, wherein the actuating drive is activated with the aid of control means that are connected to the sensor means in a signalling fashion such that a potential process-related and/or material-related deviation from a specified nominal dimension is minimized.

It is particularly advantageous if the means can be adjusted into a radially inner position, in which they do not protrude over the outer surface, particularly an above-described outer surface section of the mandrel, with the aid of the actuating drive and/or manually, for example by arranging the means such that they are aligned with the outer surface of the mandrel section arranged upstream of the means referred to the conveying direction and/or a mandrel section arranged downstream of the means referred to the conveying direction of the substrate web in the circumferential direction and/or in the conveying direction of the tubular form or radially within, i.e., offset radially inward relative to the outer surface of the mandrel section arranged upstream of the means and/or the mandrel section arranged downstream of the means.

If the means can be adjusted in a pneumatic or hydraulic fashion, it is particularly preferred that these means, particularly a preferably plate-like expansion element, forms part of the actuating drive, in which the means are acted upon with hydraulic fluid or compressed gas, particularly compressed air, in order to adjust the radial position relative to the longitudinal centre axis of the mandrel with the pressure acting upon the means.

Different options are available with respect to the arrangement of the actuating drive. It is preferred to connect the actuating drive to the means, particularly to the at least one expansion element, with the aid of power transmission means that axially extend along the mandrel, wherein the at least one actuating drive axially adjusts the power transmission means and this axial motion is converted into a radial adjusting motion of the means, for example with the aid of at least one inclined surface. The power transmission means preferably extend in the mandrel, particularly in a groove-shaped recess in the mandrel. It is preferred to arrange the adjusting drive upstream of the welding means referred to the conveying direction of the tubular form, particularly in a position, in which the substrate web is not yet formed such that it is completely closed in the circumferential direction.

As initially mentioned, the invention also pertains to a method for producing tubes for packaging tubes, particularly by utilizing a device of the above-described type. In this method, it is quintessential to extend the tubular form or to expand the diameter or the cross-sectional area of the tubular form with the aid of means that protrude over the outer surface of a mandrel section of the mandrel that is arranged upstream of the means referred to the conveying direction of the substrate web and are realized, for example, in the form of at least one preferably plate-like extension element or expansion element. In this case, it is particularly advantageous if the protrusion of the means over the outer surface of the aforementioned mandrel section is adjusted manually or automatically by means of an actuating drive, preferably in dependence on an actual dimension of the tubular form, particularly its actual diameter and/or its actual circumference.

In the inventive method, it is important to clamp the tubular form in a contact region of the substrate web with itself in order to achieve an elongation or extension of the substrate web material in the circumferential direction.

The inventive method causes an at least slight thickness change or, in more precise terms, thickness reduction of the substrate web.

BRIEF DESCRIPTION OF THE DRAWINGS

Other advantages, characteristics and details of the invention result from the following description of preferred exemplary embodiments, as well as the drawings.
In these drawings:
FIG. 2b shows a section along the line A-A in FIG. 2a,
FIG. 3a shows a side view of an alternative embodiment of a device for producing tubular bodies with means for expanding a tubular body that can be adjusted in the radial direction by means of an actuator and power transmission means.

DETAILED DESCRIPTION

In the figures, identical elements and elements with identical function are identified by the same reference symbols.

Figure 1A:
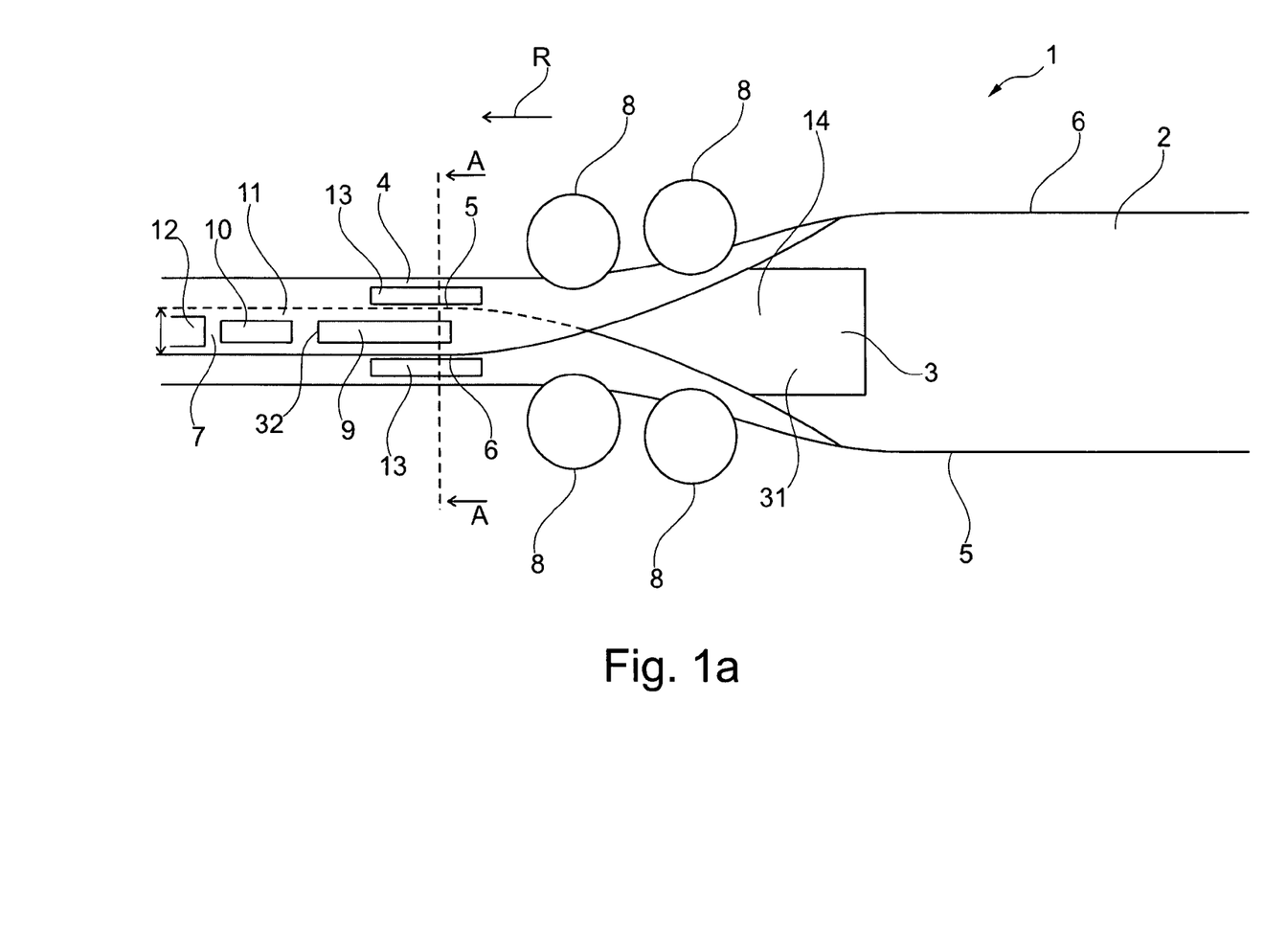
FIG. 1a shows a highly schematic top view of a device for producing tubular bodies.

FIG. 1a shows a top view of a device 1 for producing tubes for packaging tubes. A tubular form 4 is formed of a flat, web-shaped substrate 2 around a mandrel 3 that has a cylindrical shape in this case with the illustrated section of the device, wherein said tubular form features an overlapping region 7 between two longitudinal edges 5, 6 that is formed by two parallel longitudinal edge regions of the substrate 2. The formed tube is cut into tubes of the desired length (not-shown) in a region that is situated farther downstream referred to the conveying direction R. As an alternative to the embodiment shown, it would also be conceivable that the two longitudinal edges 5, 6 do not define an overlapping region, wherein no overlapping region 7 is provided, but the two longitudinal edges 5, 6 rather abut in the circumferential direction and are welded to one another or remain spaced apart from one another and are welded together with an additional not-shown substrate strip in order to produce the tubular form. In other words, the welding seam to be produced that is described in greater detail below and extends along the conveying direction does not necessarily have to be arranged in an overlapping region, but may alternatively also arranged in an abutment or contact region of the longitudinal edges 5, 6 or in a contact and/or overlapping region of the longitudinal edges with an additional substrate strip.

The substrate 2 is assigned not-shown transport rollers and/or at least one preferably elastic moulding strap, by means of which the substrate 2 is conveyed toward the mandrel 3 in the conveying direction R. The moulding is realized with the aid of concavely contoured rollers 8 that mould the substrate 2 from the flat web into a tubular form 4 that tightly surrounds the mandrel 3 and is additionally conveyed to the aforementioned not-shown cutting device in the conveying direction R along said mandrel.

Welding means 9, preferably an elongated high-frequency welding device, are situated downstream of the rollers 8 referred to the conveying direction R in order to weld together the overlapping region 7 or, in more precise terms, to weld together the longitudinal edge regions of the substrate 2 or the tubular form 4 that lie on top of one another, i.e. to produce a welding seam 11. Pressing means 10 for respectively solidifying and exerting pressure upon the welding seam 11 that was produced with the aid of the welding means 9 and obtained by means of partial cooling are situated downstream of the welding means referred to the conveying direction R. As mentioned above, it is not absolutely necessary to provide an overlapping region 7—it is merely essential that a welding seam 11 extending along the longitudinal direction of the substrate is produced. In other words, the substrate 2 (substrate web) is welded together in an elongated welding region 32 by producing the welding seam 11.

Cooling means 12 for additionally cooling the hot welding seam produced during the welding process are situated downstream of the pressing means 10 referred to the conveying direction.

Means 13 that are described in greater detail below and to which the tubular form 4, in particular, in order to prevent crease formation in the welding seam 11 are situated to both sides of the welding means 11 referred to the circumferential direction and circumferentially spaced apart therefrom. The means 13 end at approximately half the axial extent of the welding means, i.e. before the axial end situated in the conveying direction R and before the maximum temperature of the substrate is reached, namely at a position, at which the welding seam 11 is not yet produced because the substrate material is not yet solidified again due to partial cooling. For this purpose, the means 13 protrude over the cylindrical outer surface 14 of a mandrel section 31 of the mandrel 3 that is arranged upstream of the means 13 referred to the conveying direction R, wherein the protrusion, i.e. the distance, by which the means 13 maximally protrude over the outer surface 14 of the mandrel section 31, is preferably adjustable.

The generally known position of welding belts for clamping the tubular form is not illustrated in FIG. 1*a* in order to provide a better overview. In this respect, we refer to FIG. 1*b* that shows a schematic section along the line A-A in FIG. 1*a*. The device 1 comprises a first outer welding belt 34 that is driven in the axial direction with at least approximately the conveying speed of the tubular form that is not illustrated in order to provide a better overview. It consists of a revolving first welding belt 34 that is returned in an upper region in the drawing.

Figure 1B:
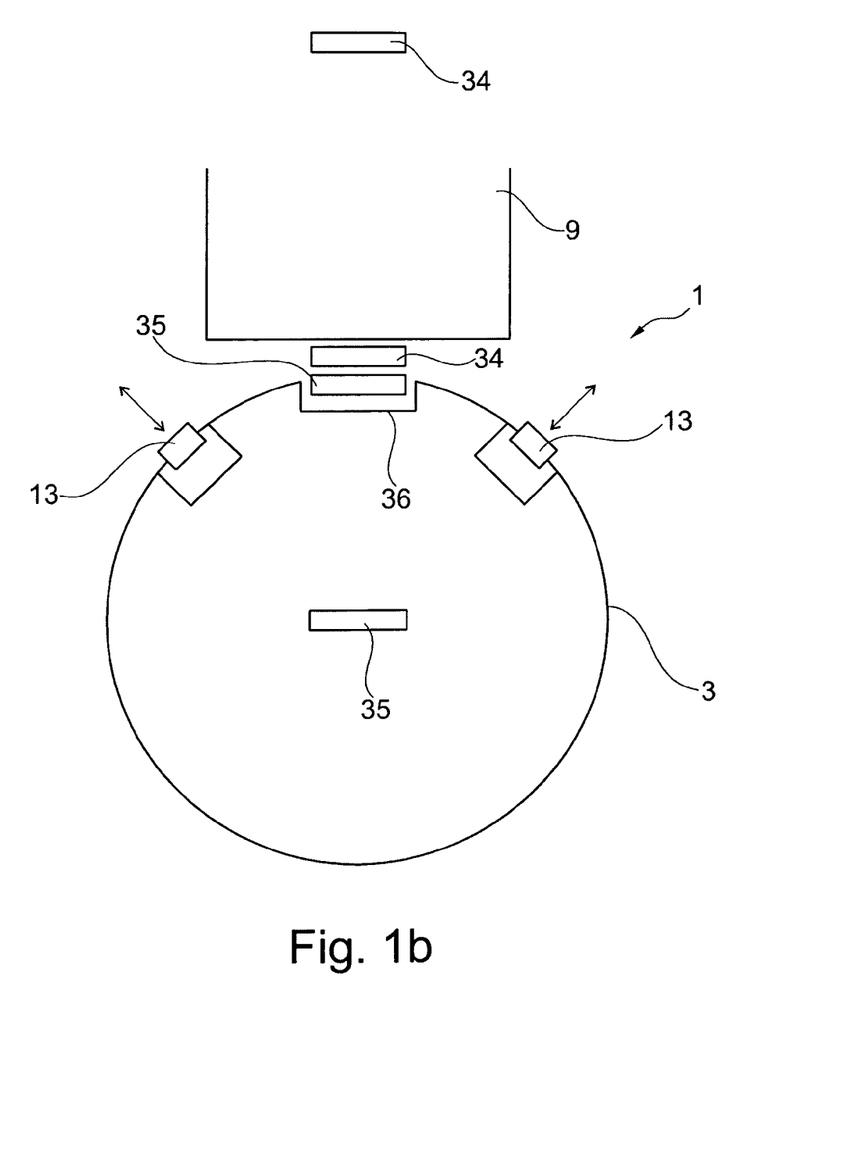
FIG. 1b shows a section along the line A-A in FIG. 1a, in which the strips that clamp the tubular form in its position and can be conveyed together with the tubular form are illustrated.

A second (inner) revolving welding belt 35 is assigned to the first welding belt 34 and returned within the mandrel. The second welding belt 35 runs within a longitudinal groove 36 in the mandrel 3. The not-shown tubular form can be clamped between the two welding belts 34, 35 in a contact region, wherein the contact region comprises the welding region, as well as a region that is situated upstream thereof referred to the conveying direction and in which the substrate web is not yet fused with the aid of the welding means 9.

This figure furthermore shows that the expansion means 13 are circumferentially spaced apart from the welding belts 34, 35, as well as from the contact or welding region. In this way, it is ensured that the force is introduced in a non-fused circumferential section of the plastic substrate. The position of the welding belts is also not illustrated in the following figures in order to provide a better overview such that we refer to FIG. 1*b* in this respect. It is not necessary to provide two welding belts. It would also be conceivable that one of the welding belts cooperates with a stationary surface, but the friction would be increased in this case.

Different embodiments of a device for producing tubular bodies are described below with reference to the following figures, wherein these embodiments can essentially be distinguished by the way, in which the protrusion of the means 13 is adjusted.

No substrate 2 is illustrated in FIGS. 2*a* to 4*d* in order to provide a better overview. The basic extent of the substrate is illustrated in an exemplary fashion in FIG. 1.

Figure 2A:
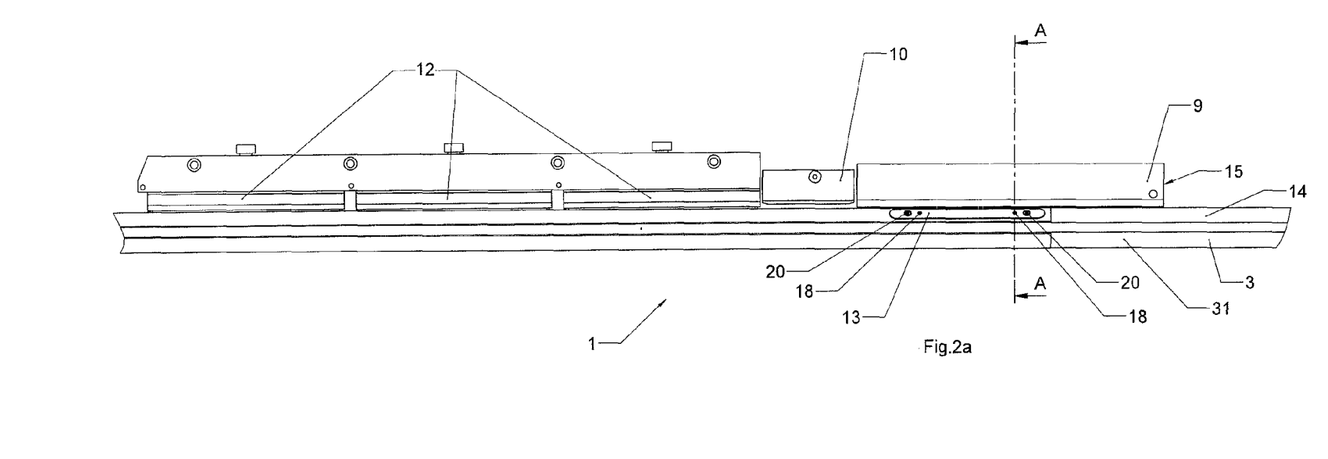
FIG. 2a shows a side view of a device for producing tubular bodies with mechanically adjustable means for expanding a tubular form.
Figure 2B:
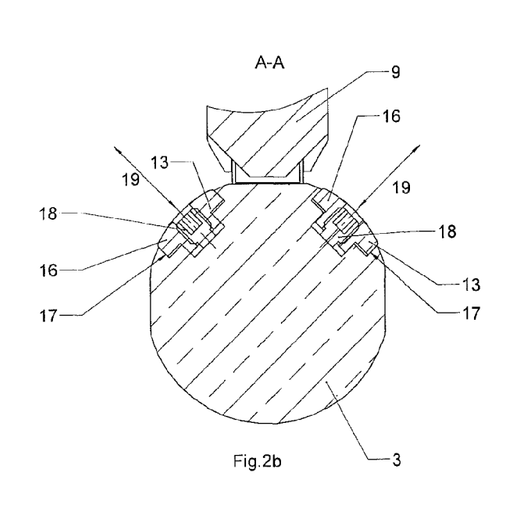

In the exemplary embodiment according to FIGS. 2*a* to 2*b*, the means 13 (expansion means) that are arranged laterally and downstream of the front end 15 as well as upstream of the rear end of the welding means 9 referred to the conveying direction R can be manually adjusted in the radial direction, i.e., by means of a manual actuation.

These figures show that the means 13 in the exemplary embodiment 2 shown comprise plate-like metallic expansion elements 16 that are inserted into correspondingly contoured recesses 17 in the mandrel 3 that has a cylindrical enveloping contour. Each element 16 is assigned at least one set screw 18 (two set screws 18 are provided per expansion element in the exemplary embodiment shown), by means of which the radial position of the means 13, namely of the expansion elements 16, can be adjusted. In other words, the protrusion of the expansion elements 16 over the approximately cylindrical outer surface 14 or an outer surface of the mandrel section 31 that has a cylindrical enveloping contour can be adjusted by manually turning the set screws 18, wherein the adjustment of the radial position should, however, respectively be carried out when the machine is not in operation as it is the case with the device 1 or when a tubular form is not yet produced of the substrate above the means 13.

The adjusting directions of the expansion elements 16 are indicated by the arrows 19. The further the means 13 are adjusted radially outward, the more the tubular form is expanded.

In addition to the set screws 18, the expansion element 16 is assigned two fixing screws 20, by means of which the expansion elements 16 are held on the mandrel 3 in a captive fashion. The expansion elements 16 are preferably adjusted in such a way that they assume a slightly inclined position and serve as run-up slope for the tubular form 4. In other words, the protrusion over the outer surface 14 of the cylindrical mandrel section 31 preferably increases in the conveying direction R.

According to FIG. 2*a*, pressing means 10 are arranged downstream of the welding means 11. Cooling means 12 that operate, for example, based on a water cooling system (continuous flow cooling system) follow these pressing means in the conveying direction R.

In the exemplary embodiment according to FIGS. 3*a* to 3*d*, the means 13 once again comprise two plate-like expansion elements 16 that can be radially adjusted in the directions indicated by the arrows 19. The expansion elements 16 are also held on the mandrel 3 in a captive fashion by means of fixing screws 20 in this case. In contrast to the preceding exemplary embodiment, the means 13 in the exemplary embodiment shown, specifically the expansion elements 16, can be adjusted, for example, by means of an electromotive, pneumatic or hydraulic actuating drive 21 that can be adjusted in the radial direction by means of axially extending power transmission means 22 that comprise a rod in this case, wherein the power transmission means 22 functionally connect the actuating drive 21 arranged upstream of the welding means 9 referred to the conveying direction to the means 13, and wherein the power transmission means 22 act upon an inclined surface 23 with expansion elements 16 such that an axial adjusting motion of the power transmission means 22 indicated by the arrows 24 results in the radial adjusting motion of the means 13 in the directions of the arrows 19. The drive 21 may consist, for example, of a piston/cylinder drive or of a rotary drive.

Figure 3A:
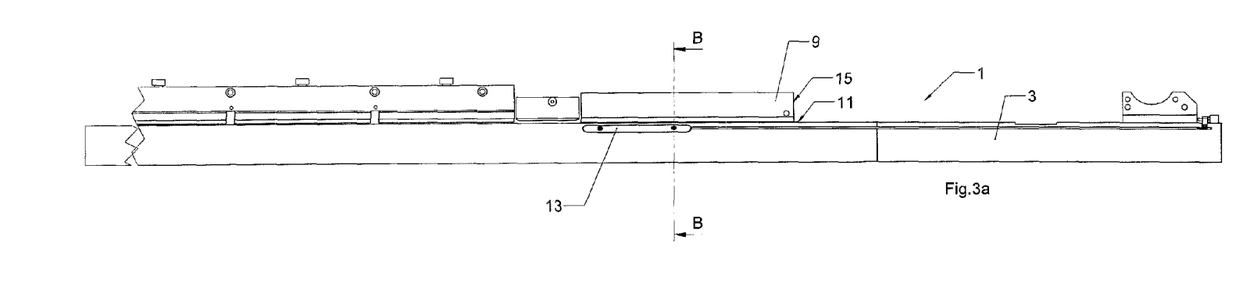
Figure 3B:
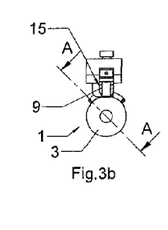
FIG. 3b shows a front view of the device according to FIG. 3a that is turned by 90°.
Figure 3C:
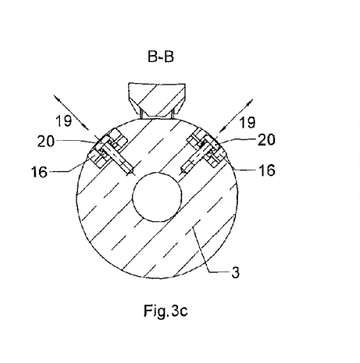
FIG. 3c shows a section along the line B-B in FIG. 3a,
FIG. 3d shows a section along the line A-A in FIG. 3b.
Figure 3D:
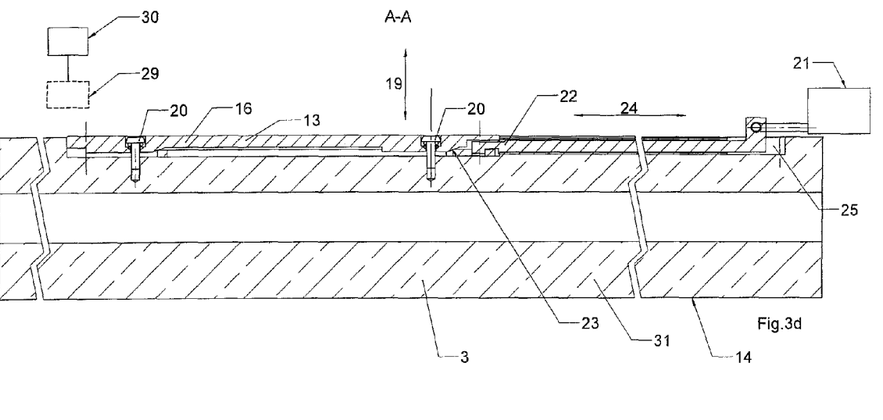
Figure 4A:
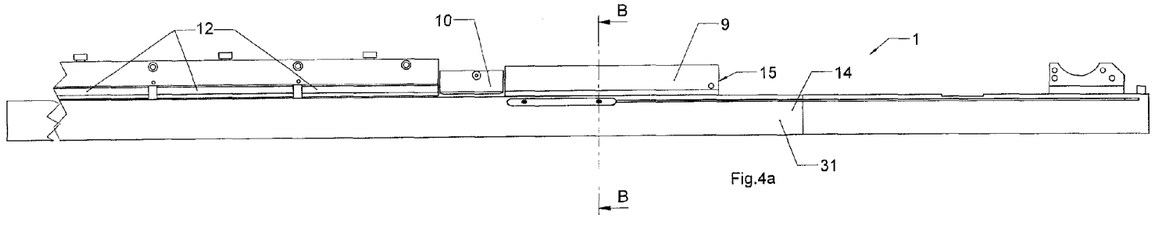
FIG. 4a shows a side view of another alternative embodiment of a device for producing tubular bodies with means that can be pneumatically adjusted in the radial direction.
Figure 4B:
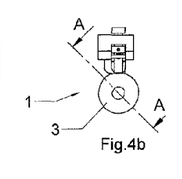
FIG. 4b shows a front view of the device according to FIG. 4a that is turned by 90°.
Figure 4C:
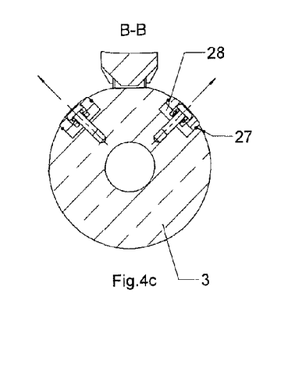
FIG. 4c shows a section along the line B-B in FIG. 3a,
FIG. 4d shows a section along the line A-A in FIG. 4b.
Figure 4D:
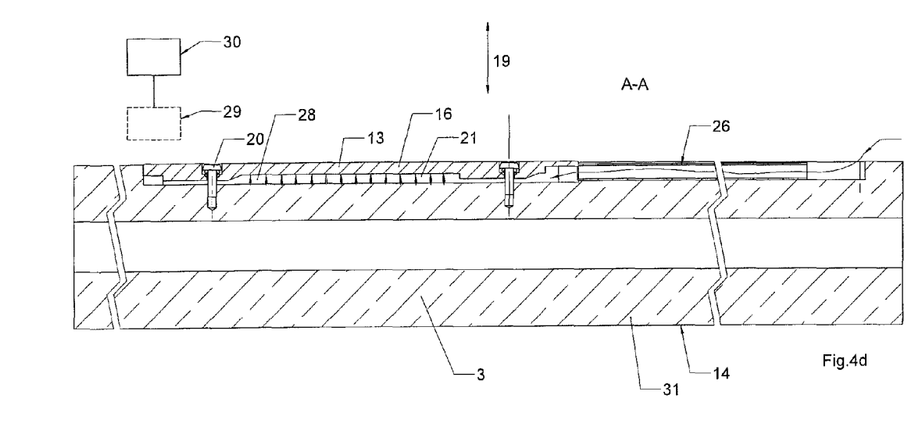

According to FIG. 3d, the mechanical power transmission rod (power transmission means 22) is inserted into a groove 25 in the mandrel 3 that is open radially outward and mechanically coupled to the means 13.

In the exemplary embodiment according to FIGS. 4a to 4d, the means 13 directly form part of the actuating drive 21 that consists of a pneumatic actuating drive in this case and also comprises a not-shown pressure source, namely a pressure source for compressed air in this case. This compressed air is conveyed into a region situated radially underneath the expansion elements 16 through an axial channel 26 in the mandrel 3 and presses the expansion elements radially outward, wherein the force, with which the means 13 press radially outward against the tubular form, depends on the pressure of the fluid, namely the pressure of compressed air in this case. The embodiment according to FIGS. 4a to 4d could alternatively also be realized hydraulically. It is also possible to convert the pressure of the fluid (hydraulic fluid or compressed gas) into an adjusting motion by means of a piston/cylinder drive and to transmit this adjusting motion to the means 13.

In order to ensure a sufficient impermeability of the actuating drive 21, the circumferential edge of the means 13 or, in more precise terms, of the radially displaceable expansion elements 16 is sealed relative to the mandrel 3 by means of a seal 27, preferably a ring seal, such that a comparatively impermeable pressure chamber 28 that can be filled with the pressure medium is formed underneath the expansion elements 16.

In the exemplary embodiments according to FIGS. 3a to 4d, in particular, sensor means 29 that merely are schematically indicated may be provided and connected to control means 30 that are also merely indicated in a signalling fashion, wherein said control means are in turn connected to the actuating drive 21 or to a valve of the actuating drive in the exemplary embodiment according to FIGS. 4a to 4d in a (not-shown) signalling fashion and activate the actuating drive or part of the actuating drive such as a valve in dependence on an actual dimension measured by the sensor means 29, for example a diameter or circumference of the tubular form, such that the actuating drive 21 adjusts the radial position of the means 13 in such a way that deviations from a specified nominal dimension such as, for example, a nominal diameter and/or a nominal circumference are minimized.

Figure 5:
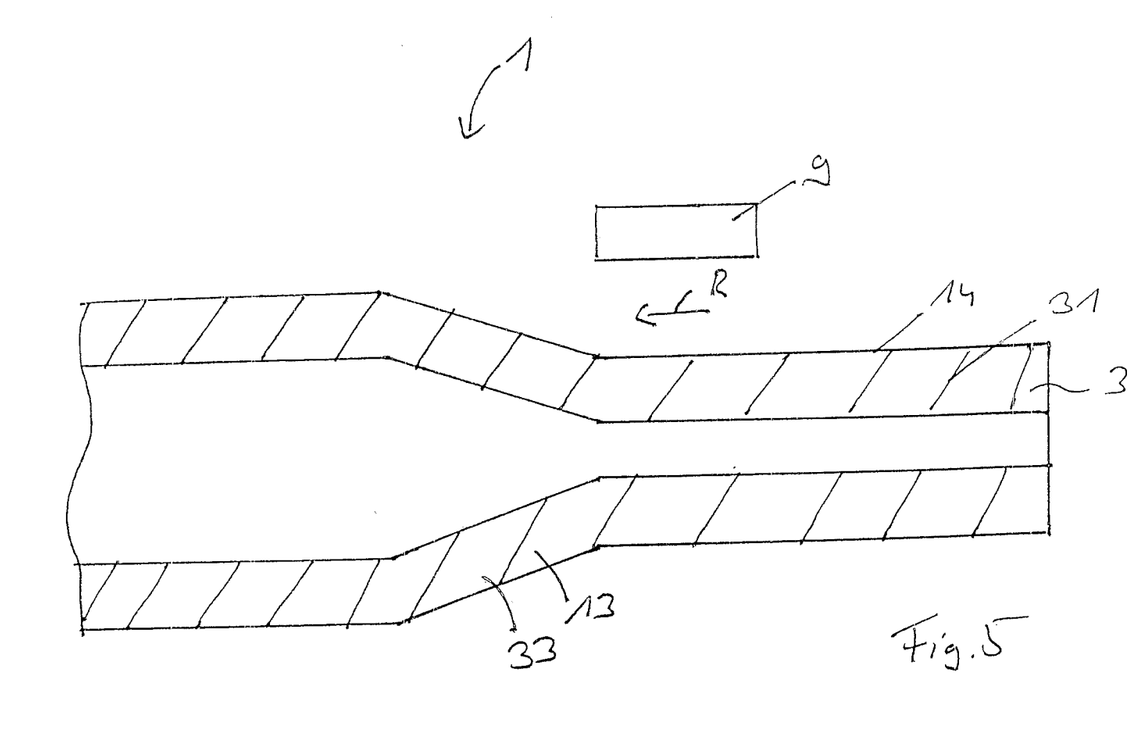
FIG. 5 shows a highly schematic illustration of a mandrel with integral means for expanding the tubular body.

FIG. 5 shows a device 1 for producing tubes in the form of a highly schematic and incomplete illustration. This figure shows a mandrel 3 with a circumferential section 33 that is contoured in a conical fashion in this case and serves as the means 13 for expanding the tubular form. The circumferential section 13 radially protrudes over the outer surface of a mandrel section 31 that is arranged upstream of the means 13 referred to the conveying direction R such that the tubular form is extended in the radial direction and therefore also in the circumferential direction while it is conveyed in the conveying direction R and a smooth welding seam 11 is produced by subsequently cooling the welding region.

As mentioned above, the means 13 in the exemplary embodiment according to FIG. 5 form an integral component of the mandrel 3 or are directly formed by this mandrel itself.

In a not-shown alternative variation, the circumferential section 33 with a diameter that increases in the conveying direction R may also be divided into several circumferential segments, at least one of which radially protrudes over the outer surface 14 of the mandrel section 31 or at least can be adjusted into such a position.

The invention claimed is:

1. A device for producing tubes for packaging tubes, comprising an elongated mandrel (3), around which a substrate web can be formed in order to produce a tubular form (4) that surrounds the mandrel (3) and can be conveyed along the mandrel (3) in a conveying direction (R), as well as welding means (9) for welding the substrate web along a welding region in order to produce a welding seam (11) and at least one first welding belt (34) that can be conveyed together with the tubular form (4) and fixes the tubular form in a contact region of the substrate web with itself by clamping the substrate web between the first welding belt (34) and a clamping partner, wherein means (13) are provided for expanding the tubular form (4) fixed by the first welding belt (34) and the clamping partner by plastically elongating the substrate web in the circumferential direction, wherein said means can be adjusted into a position, in which they radially protrude over the outer surface (14) of the mandrel section (31) of the mandrel (3) that is arranged upstream of the means (13) referred to the conveying direction (R), wherein the means (13) can be adjusted manually, or automatically by at least one actuating drive (21), in the radial direction in order to adjust the protrusion over the outer surface (14) of the mandrel (3).

2. The device according to claim 1, wherein the welding seam (9) can be produced of the substrate web material only by fusing the tubular form (4) in the welding region.

3. The device according to claim 1, wherein the clamping partner is formed by a second welding belt (35).

4. The device according to claim 1, wherein the means (13) feature at least one expansion element (16) that is realized in a plate-like fashion or formed by a circumferential section (33) of the mandrel and serves for radially adjoining the inside of the tubular form (4).

5. The device according to claim 4, wherein the at least one expansion element (16) has a surface that is curved in the circumferential direction.

6. The device according to claim 4, wherein the at least one expansion element (16) comprises two expansion elements (16) that are spaced apart from one another or can be spaced apart from one another in the circumferential direction.

7. The device according to claim 1, wherein the means (13) are arranged relative to the welding means (9) in the longitudinal direction of the tubular form (4) such that an extension of the tubular form (4) results before and/or during and/or after the production of the welding seam (11).

8. The device according to claim 1, wherein the means (13) are arranged circumferentially adjacent to and/or upstream of an axial end of the welding means (9) referred to a conveying direction (R) of the tubular form.

9. The device according to claim 8, wherein the means (13) are arranged such that the means (13) end at an axial position that lies in an axial region between ⅓ and ⅔ of the axial extent of the welding means.

10. The device according to claim 1, wherein the actuating drive (21) is functionally connected to the means (13) by means of axial power transmission means (22) that are arranged in and/or on the mandrel (3) and can be adjusted relative thereto.

11. The device according to claim 1, wherein sensor means (29) are provided for determining an actual dimension of the tubular form (4) wherein the dimension is the circumference and/or the diameter of the tubular form (4), and wherein the sensor means (29) are connected to control means (30) in a signalling fashion, and wherein the control means (30) are designed for activating the actuating drive (21) in dependence on the sensor signal such that deviations from a nominal dimension are reduced to zero.

12. The device according to claim 1, wherein the outer surface (14) of the mandrel section (31) of the mandrel (3) is cylindrical.

13. The device according to claim 1, wherein the means (13) can be adjusted into a position radially within the outer surface (14) of the mandrel (3) and/or into a position, in which the means (13) are aligned with the outer surface (14) of the mandrel (3) in the circumferential direction and/or in the axial direction.

14. A method for producing tubes for packaging tubes by means of a device, wherein a substrate web is formed around an elongated mandrel (3) in such a way that the substrate web surrounds the mandrel (3) in order to produce a tubular form (4), wherein the substrate web is welded in a welding region in order to produce a welding seam (11), wherein the tubular form (4) is conveyed along the mandrel (3) in a conveying direction (R), and wherein the tubular form (4) is clamped in a contact region of the substrate web with itself, wherein the tubular form (4) is expanded while it is clamped by being plastically elongated in the circumferential direction with the aid of means (13) that radially protrude over the outer surface of a mandrel section (31) that is arranged upstream of the means referred to the conveying direction (R), wherein the protrusion of the means (13) over the outer surface (14) of the mandrel section (31) is adjusted manually or automatically by means of an actuating drive (21).

15. The method according to claim 14, wherein the protrusion of the means (13) is adjusted by means of a control in dependence on an actual dimension of the tubular form (4), in an automatic fashion by means of an actuating drive (21) in a radial protruding range between 0.1 mm and 1.2 mm.

* * * * *